July 25, 1961   D. J. KINZER   2,994,034
APPARATUS FOR INDICATING THE LEVEL OF A
MAGNETIZABLE SUBSTANCE IN A BIN
Filed April 22, 1958
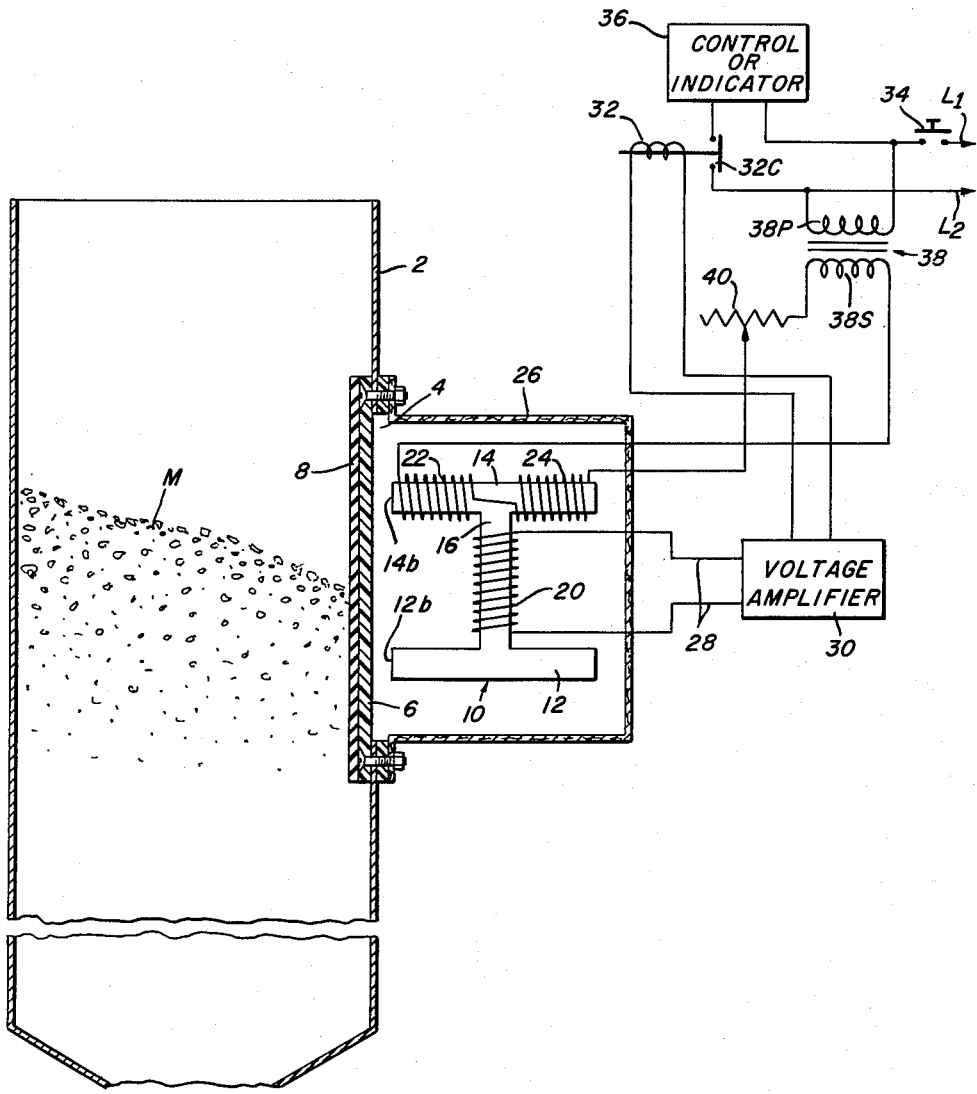
INVENTOR
DAN J. KINZER
By Donald G. Dalton
Attorney

United States Patent Office 2,994,034
Patented July 25, 1961

2,994,034
APPARATUS FOR INDICATING THE LEVEL OF A MAGNETIZABLE SUBSTANCE IN A BIN
Dan J. Kinzer, 366 Wells Ave., Orem, Utah
Filed Apr. 22, 1958, Ser. No. 730,112
4 Claims. (Cl. 324—41)

This invention relates to apparatus for indicating the level of a magnetizable substance in a bin in which an inductor limit controller is used as a limit switch to indicate the presence of a magnetizable substance such, for example, the level of magnetic ore in a bin. Limit switches are, of course, old but those of which I have knowledge have various drawbacks. Most of such switches have moving parts and many are actuated by contact of an object.

It is therefore object of my invention to provide an apparatus for indicating the level of a magnetizable substance in a bin.

This and other objects will be more apparent after referring to the following specification and attached drawings, in which the single figure is a schematic drawing of the limit controller arranged to indicate the level of iron ore in a bin.

Referring more particularly to the drawings, the reference numeral 2 indicates a bin having iron ore M therein. An opening 4 is provided in the wall of the bin and a plate of micarta or other nonmagnetic material is placed over the opening. A sheet 8 of rubber belting or similar material is preferably placed over the plate 6 to serve as a wearing surface. A laminated iron H-shaped core 10 is mounted adjacent the plate 6 on the outside of the bin. The core 10 may be mounted in any suitable manner on the plate 6 and has two legs 12 and 14 connected by means of a cross bar 16. While it is preferred to have the two legs at the same level they are shown at different levels for the purpose of better illustration. A first winding of electrically conducting wire 20 surrounds the cross bar 16 and second and third coils 22 and 24 surround the leg 14, one on each side of the cross bar 16. To protect the core from dirt it is preferably enclosed in a wooden box 26. The winding 20 may consist of 4000 turns of No. 32 wire and the windings 22 and 24 of 400 turns of No. 32 wire. The windings 22 and 24 are identical and are connected in series opposition. Winding 20 is connected by means of wires 28 to a voltage amplifier 30. The output of amplifier 30 is connected to a relay coil 32 having a normally open contact 32C. The contact 32C is connected in lines L1—L2 which provides a 120 volt alternating current source. A manually operated switch 34 is also arranged in the lines L1—L2. The contact 32C controls the flow of current to a control or indicator 36. The lines L1—L2 are also connected to the primary 38P of a transformer 38 which has a secondary winding 38S. The transformer 38 transforms the current to 60 volt A.C. The secondary 38S is connected to the coils 22 and 24 through a potentiometer 40.

The operation of my device is as follows:

With the switch 34 closed current will flow through the coils 22 and 24. If there is no iron ore M in the bin 2 at the level of the legs 12 and 14 there will be no magnetic coupling between ends 12b and 14b of the legs 12 and 14. Therefore, there will be no voltage induced in coil 20. When the level of the material M reaches the level of leg 14 a magnetic coupling will be provided between the legs 12 and 14, thus inducing a voltage in coil 20. This will energize the relay coil 32 to close the contact 32C so that current will flow to the indicator 36. If desired, a control could also be associated with the indicator to control flow of material into or from the bin 2. The potentiometer 40 can be adjusted to increase or decrease the sensitivity of the controller. It will be understood that the controller may be used as a limit switch to indicate and/or control the movement of cranes, transfer cars, ingot buggies, hoists or any material made of or carrying a magnetizable material.

While one embodiment of my invention has been shown and described it will be apparent that other adaptations and modifications may be made without departing from the scope of the following claims.

I claim:

1. Apparatus for indicating the level of a magnetizable substance in a bin comprising a core mounted adjacent said bin, a nonmagnetizable shield forming the wall of said bin at the level of said core, a first coil of electrically conducting wire surrounding said core, second and third coils of electrically conducting wire surrounding said core in spaced relationship to said first coil, said second and third coils being equal and connected in series opposition, means for supplying alternating current to said second and third coils and means operable by the output of said first coil to indicate the presence of magnetizable substance in said bin at the level of said core.

2. Apparatus for indicating the level of a magnetizable substance in a bin comprising a core mounted adjacent said bin, a nonmagnetizable shield forming the wall of said bin at the level of said core, a first coil of electrically conducting wire surrounding said core, second and third coils of electrically conducting wire surrounding said core in spaced relationship to said first coil, said second and third coils being equal and connected in series opposition, a voltage amplifier connected across the ends of said first coil, a source of alternating current, a transformer having its primary connected to said source of alternating current and its secondary connected to said second and third coils, a potentiometer in the connection to said second and third coils, and means operable by the output of said amplifier to indicate the presence of magnetizable substance in said bin at the level of said core.

3. Apparatus for indicating the level of a magnetizable substance in a bin comprising a laminated iron H-shaped core mounted adjacent said bin with an end of each leg adjacent the bin, a nonmagnetizable shield forming the wall of said bin at the level of said core, a first coil of electrically conducting wire surrounding the cross bar of the core, second and third coils of electrically conducting wire surrounding one leg of the core one on each side of the cross bar, said second and third coils being equal and connected in series opposition, means for supplying alternating current to said second and third coils, and means operable by the output of said first coil to indicate the presence of magnetizable substance in said bin at the level of said core.

4. Apparatus for indicating the level of a magnetizable substance in a bin comprising a laminated iron H-shaped core mounted adjacent said bin with an end of each leg adjacent the bin, a nonmagnetizable shield forming the wall of said bin at the level of said core, a first coil of electrically conducting wire surrounding the cross bar of the core, second and third coils of electrically conducting wire surrounding one leg of the core one on each side of the cross bar, said second and third coils being equal and connected in series opposition, a voltage amplifier connected across the ends of said first coil, a source of alternating current, a transformer having its primary connected to said source of alternating current and its secondary connected to said second and third coils, a potentiometer in the connection to said second and third coils, and means operable by the output of said amplifier to indicate the presence of magnetizable substance in said bin at the level of said core.

References Cited in the file of this patent

UNITED STATES PATENTS

| | | |
|---|---|---|
| 1,925,904 | Mayne | Sept. 5, 1933 |
| 1,966,984 | Lichtenberger et al. | July 17, 1934 |
| 2,598,252 | Gossick | May 27, 1952 |
| 2,711,510 | Tricebock | June 21, 1955 |
| 2,915,699 | Mierendorf et al. | Dec. 1, 1959 |

OTHER REFERENCES

"The Prison Gun Detector," by D. C. C. Luck and C. J. Young, Radio World (December 1936), pages 50–56.